US010055392B2

(12) United States Patent
Kraley (10) Patent No.: US 10,055,392 B2
(45) Date of Patent: Aug. 21, 2018

(54) HISTORY-BASED ARCHIVE MANAGEMENT

(75) Inventor: Mike Kraley, Lexington, MA (US)

(73) Assignee: Adobe Systems Incorporated, San Jose, CA (US)

( * ) Notice: Subject to any disclaimer, the term of this patent is extended or adjusted under 35 U.S.C. 154(b) by 608 days.

(21) Appl. No.: 12/119,421

(22) Filed: May 12, 2008

(65) Prior Publication Data

US 2014/0032502 A1    Jan. 30, 2014

(51) Int. Cl.
*G06F 17/22* (2006.01)

(52) U.S. Cl.
CPC ................................ *G06F 17/2288* (2013.01)

(58) Field of Classification Search
None
See application file for complete search history.

(56) References Cited

U.S. PATENT DOCUMENTS

| | | | |
|---|---|---|---|
| 4,714,992 A | 12/1987 | Gladney et al. |
| 4,949,300 A | 8/1990 | Christenson et al. |
| 5,008,853 A | 4/1991 | Bly et al. |
| 5,014,267 A | 5/1991 | Tompkins et al. |
| 5,072,412 A | 12/1991 | Henderson, Jr. et al. |
| 5,220,657 A | 6/1993 | Bly et al. |
| 5,245,553 A | 9/1993 | Tanenbaum |
| 5,247,615 A | 9/1993 | Mori et al. |
| 5,293,619 A | 3/1994 | Dean |
| 5,339,389 A | 8/1994 | Bates et al. |
| 5,379,374 A | 1/1995 | Ishizaki et al. |
| 5,388,196 A | 2/1995 | Pajak et al. |
| 5,428,729 A | 6/1995 | Chang et al. |
| 5,446,842 A | 8/1995 | Schaeffer et al. |
| 5,471,318 A | 11/1995 | Ahuja et al. |
| 5,515,491 A | 5/1996 | Bates et al. |

(Continued)

FOREIGN PATENT DOCUMENTS

EP    932108 A2  *  7/1999

OTHER PUBLICATIONS

Simsarian, Kristian, et al., "Shared Spatial Desktop Development", *Kungl Tekniska Hogskolan Royal Institute of Technology Numerical Analysis and Computing Science. CID-86, KTH*, Stockholm, Sweden 1999, Report No. CID-86 ISSN No. ISSN 1403-073X Reports can be ordered from: URL: http://www.nada.kth.se/cid/,(Aug. 1999),103 pages.

(Continued)

*Primary Examiner* — Ashish K Thomas
*Assistant Examiner* — Mellissa M Ohba
(74) *Attorney, Agent, or Firm* — Shook, Hardy & Bacon, LLP (57) ABSTRACT

Apparatus, systems, and methods may operate to determine a proximate save time difference between a target version of electronic content and a next (proximate in time and newer) version of the electronic content. An aged save time difference may be determined as the time difference between the current time and either one of the target version or the next version. The target version of the electronic content may be pruned from a plurality of revisions of the electronic content if the proximate save time difference is less than a selected fraction of the aged save time difference. The plurality of revisions, less the pruned revisions, may be displayed along a historical time line as part of a graphical user interface.

26 Claims, 6 Drawing Sheets

(56) References Cited

U.S. PATENT DOCUMENTS

| | | | |
|---|---|---|---|
| 5,537,529 A * | 7/1996 | Borovoy et al. | 715/203 |
| 5,608,872 A | 3/1997 | Schwartz et al. | |
| 5,617,539 A | 4/1997 | Ludwig et al. | |
| 5,664,183 A | 9/1997 | Cirulli et al. | |
| 5,671,428 A * | 9/1997 | Muranaga et al. | 715/751 |
| 5,732,184 A * | 3/1998 | Chao et al. | 386/55 |
| 5,758,079 A | 5/1998 | Ludwig et al. | |
| 5,764,902 A | 6/1998 | Rothrock | |
| 5,778,368 A | 7/1998 | Hogan et al. | |
| 5,787,175 A | 7/1998 | Carter | |
| 5,806,078 A * | 9/1998 | Hug et al. | 715/205 |
| 5,835,601 A | 11/1998 | Shimbo et al. | |
| 5,867,654 A | 2/1999 | Ludwig et al. | |
| 5,907,324 A | 5/1999 | Larson et al. | |
| 5,909,689 A * | 6/1999 | Van Ryzin | |
| 5,920,694 A | 7/1999 | Carleton et al. | |
| 5,963,208 A | 10/1999 | Dolan et al. | |
| 5,966,512 A | 10/1999 | Bates et al. | |
| 5,978,817 A | 11/1999 | Giannandrea et al. | |
| 5,995,097 A | 11/1999 | Tokumine et al. | |
| 6,005,568 A | 12/1999 | Simonoff et al. | |
| 6,005,571 A | 12/1999 | Pachauri | |
| 6,088,702 A | 7/2000 | Plantz et al. | |
| 6,243,722 B1 | 6/2001 | Day | |
| 6,314,408 B1 | 11/2001 | Salas et al. | |
| 6,314,425 B1 | 11/2001 | Serbinis et al. | |
| 6,366,930 B1 * | 4/2002 | Parker et al. | |
| 6,366,933 B1 | 4/2002 | Ball et al. | |
| 6,442,748 B1 | 8/2002 | Bowman-Amuah et al. | |
| 6,446,093 B2 | 9/2002 | Tabuchi | |
| 6,502,113 B1 | 12/2002 | Crawford et al. | |
| 6,507,845 B1 | 1/2003 | Cohen et al. | |
| 6,584,466 B1 | 6/2003 | Serbinis et al. | |
| 6,596,030 B2 * | 7/2003 | Ball et al. | 715/234 |
| 6,632,251 B1 | 10/2003 | Rutten et al. | |
| 6,643,663 B1 | 11/2003 | Dabney et al. | |
| 6,701,345 B1 | 3/2004 | Carley et al. | |
| 6,721,921 B1 | 4/2004 | Altman | |
| 6,757,871 B1 | 6/2004 | Sato et al. | |
| 6,772,393 B1 | 8/2004 | Estrada et al. | |
| 6,816,906 B1 | 11/2004 | Icken et al. | |
| 6,819,806 B1 | 11/2004 | Kubota et al. | |
| 6,839,878 B1 | 1/2005 | Icken et al. | |
| 6,865,548 B2 | 3/2005 | Wiechers | |
| 6,865,713 B1 | 3/2005 | Bates et al. | |
| 6,874,124 B2 | 3/2005 | Murase et al. | |
| 6,889,896 B2 | 5/2005 | Silverbrook et al. | |
| 6,894,804 B2 | 5/2005 | Nguyen et al. | |
| 6,898,601 B2 | 5/2005 | Amado et al. | |
| 6,901,376 B1 | 5/2005 | Sculler et al. | |
| 6,918,082 B1 | 7/2005 | Gross et al. | |
| 6,934,721 B2 | 8/2005 | Schein | |
| 6,950,828 B2 | 9/2005 | Shaw et al. | |
| 6,965,900 B2 * | 11/2005 | Srinivasa | G06F 17/30699 |
| 6,991,154 B2 | 1/2006 | Silverbrook et al. | |
| 7,007,232 B1 | 2/2006 | Ross et al. | |
| 7,028,267 B1 | 4/2006 | Beezer et al. | |
| 7,044,363 B2 | 5/2006 | Silverbrook et al. | |
| 7,051,031 B2 | 5/2006 | Schein | |
| 7,062,497 B2 * | 6/2006 | Hamburg et al. | |
| 7,062,532 B1 | 6/2006 | Sweat et al. | |
| 7,146,367 B2 | 12/2006 | Shutt | |
| 7,149,760 B1 * | 12/2006 | Breuer | |
| 7,246,311 B2 * | 7/2007 | Bargeron | G06F 17/211 |
| | | | 715/251 |
| 7,249,314 B2 | 7/2007 | Walker et al. | |
| 7,263,655 B1 | 8/2007 | Carden, Jr. | |
| 7,325,186 B2 | 1/2008 | Jones et al. | |
| 7,392,469 B1 | 6/2008 | Bailin | |
| 7,421,660 B2 * | 9/2008 | Charnock et al. | 715/751 |
| 7,574,669 B1 | 8/2009 | Braun et al. | |
| 7,676,759 B2 | 3/2010 | Carter | |
| 7,702,618 B1 * | 4/2010 | Patterson | G06F 17/2288 |
| | | | 707/999.003 |
| 7,724,249 B1 | 5/2010 | Horikawa et al. | |
| 7,769,810 B1 | 8/2010 | Kaufman | |
| 7,788,237 B2 * | 8/2010 | Voronov et al. | 707/695 |
| 7,809,688 B2 * | 10/2010 | Cisler et al. | 707/654 |
| 7,836,083 B2 * | 11/2010 | Cipollone | 707/792 |
| 7,904,425 B2 * | 3/2011 | Cannon et al. | 707/654 |
| 7,945,595 B1 | 5/2011 | Kraley | |
| 7,949,633 B1 | 5/2011 | Shaver et al. | |
| 7,950,064 B2 | 5/2011 | Chavez et al. | |
| 8,290,902 B1 | 10/2012 | Shaver et al. | |
| 8,316,292 B1 * | 11/2012 | Verstak et al. | 715/229 |
| 8,396,900 B1 | 3/2013 | Kraley | |
| 2001/0049704 A1 * | 12/2001 | Hamburg et al. | 707/530 |
| 2002/0163548 A1 * | 11/2002 | Chiu et al. | 345/864 |
| 2002/0186252 A1 | 12/2002 | Himmel et al. | |
| 2003/0214528 A1 | 11/2003 | Pierce et al. | |
| 2004/0041843 A1 | 3/2004 | Cui et al. | |
| 2004/0088331 A1 * | 5/2004 | Therrien et al. | 707/200 |
| 2004/0172595 A1 | 9/2004 | Lerner et al. | |
| 2005/0064858 A1 | 3/2005 | Makela et al. | |
| 2005/0097441 A1 * | 5/2005 | Herbach et al. | 715/501.1 |
| 2005/0193325 A1 | 9/2005 | Epstein | |
| 2005/0262225 A1 | 11/2005 | Halpern et al. | |
| 2006/0010382 A1 * | 1/2006 | Ejiri et al. | 715/712 |
| 2006/0026502 A1 | 2/2006 | Dutta | |
| 2006/0161516 A1 * | 7/2006 | Clarke et al. | 707/2 |
| 2006/0161578 A1 | 7/2006 | Siegel et al. | |
| 2006/0184901 A1 | 8/2006 | Dietz | |
| 2007/0057967 A1 * | 3/2007 | Armstrong | 345/619 |
| 2007/0118794 A1 | 5/2007 | Hollander et al. | |
| 2007/0150433 A1 * | 6/2007 | Chen | 707/1 |
| 2007/0198616 A1 * | 8/2007 | Goto | 707/205 |
| 2007/0239831 A1 | 10/2007 | Basu | |
| 2007/0260996 A1 * | 11/2007 | Jakobson | 715/781 |
| 2007/0271502 A1 | 11/2007 | Bedi et al. | |
| 2008/0016091 A1 | 1/2008 | Chandra | |
| 2008/0034018 A1 * | 2/2008 | Cisler et al. | 707/204 |
| 2008/0059539 A1 | 3/2008 | Chin et al. | |
| 2008/0103877 A1 | 5/2008 | Gerken | |
| 2008/0141126 A1 | 6/2008 | Johnson et al. | |
| 2008/0209361 A1 | 8/2008 | Nickerson et al. | |
| 2008/0250329 A1 | 10/2008 | Stefik et al. | |
| 2008/0250332 A1 | 10/2008 | Farrell et al. | |
| 2009/0157811 A1 | 6/2009 | Bailor et al. | |
| 2010/0145947 A1 | 6/2010 | Kolman et al. | |
| 2013/0006919 A1 | 1/2013 | Shaver et al. | |
| 2013/0198622 A1 | 8/2013 | Kraley | |
| 2014/0032633 A1 | 1/2014 | Kleppner | |
| 2014/0033013 A1 | 1/2014 | Shaver | |
| 2014/0033015 A1 | 1/2014 | Shaver | |
| 2014/0033099 A1 | 1/2014 | Treitman et al. | |

OTHER PUBLICATIONS

"Adobe to Acquire Virtual Ubiquity", *The Buzzword Blog Building the first real word processor for the web*, [Online] Retrieved from the internet: <URL:http://blog.buzzword.com/vu/index.php-?paged=2>, (Oct. 1, 2007), 10 pgs.

"Comparison of office suites", *Comparison of office suites—Wikipedia, the free encyclopedia*, [Online] Retrieved from the internet: <URL:http://en.wikipedia.org/wiki/List_of_office_suites>, (Mar. 16, 2008), 4 pgs.

"Forthcoming Functionality", *The Buzzword Blog Building the first real word processor for the web*, [Online] Retrieved from the internet: <URL:http://blog.buzzword.com/vu/index.php?paged=3>, (Jul. 15, 2007), 10 pgs.

"Google Docs", *Google Docs—Wikipedia, the free encyclopedia*, [Online]. Retrieved from the internet: <URL:http://en.wikipedia.org/wiki/Google_Docs>, (Mar. 16, 2008), 3 pgs.

"List of word processors", *From Wikipedia, the free encyclopedia The following is a list of word processors*, [Online] Retrieved from the internet: <URL:http://en.wikipedia.org/wiki/List_of_word_processors>, (Mar. 16, 2008), 4 pgs.

"The Buzzword Blog Building the first real word processor for the web", *Buzzword vs Google docs*, [Online] Retrieved from the internet: <URL:http://blog.virtub.com/>, (Mar. 12, 2008), 13 pgs.

(56) References Cited

OTHER PUBLICATIONS

"ThinkFree Docs : Search, Share & Publish documents Page", [Online] Retrieved from the internet: <URL:http://www.thinkfreedocs.com/, (Mar. 16, 2008), 1 pg.
"ThinkFree Docs::Search, Share & Publish documents", [Online]. Retrieved from the internet: <URL:http://www.thinkfreedocs.com/about/faq.html>, FAQ, (Mar. 16, 2008), 1 pg.
"ThinkFree Office by Haansoft Corporation", *From Wikipedia, the free encyclopedia (Redirected from ThinkFree)*, [Online] Retrieved from the internet: <URL:http://en.wikipedia.org/wiki/ThinkFree>, (Nov. 7, 2006), 3 pgs.
"Working with Collaborators: Real time collaboration", [Online]. Retrieved from the internet: <URL:http://documents.google.com/support/bin/answer.py?answer=40971&topic=8628>, Google Docs Help Center, (Mar. 16, 2008), 2 pgs.
"Working with Collaborators: Simultaneous editing and viewing", [Online]. Retrieved from the internet: <URL:http://documents.google.com/support/bin/answer.py?answer=44680&topic=8628>, Google Docs Help Center, (Mar. 16, 2008), 2 pgs.
"ZCubes", *From Wikipedia, the free encyclopedia,* [Online] Retrieved from the internet: <URL:http://en.wikipedia.org/wiki/ZCubes>, (Sep. 30, 2007), 5 pgs.
"Zoho Office Suite", *From Wikipedia, the free encyclopedia (Redirected from Zoho Writer) Developed by AdventNet Inc.* <URL:http://www.zoho.com>, [Online] Retrieved from the interent: <URL:http://en.wikipedia.org/wiki/Zoho_Writer>, (Mar. 16, 2008), 5 pgs.
Descy, Don E, "Browser-Based Online Applications: Something for Everyone!", *TechTrends: Linking Research and Practice to Improve Learning,* 51(2), (Mar. 2007), pp. 3-5.
Shen, H., "Integrating Advanced Collaborative Capabilities into Web-Based Word Processors", *Lecture Notes in Computer Science,* 4674, (2007), pp. 1-8.
"U.S. Appl. No. 12/119,249, Non-Final Office Action dated Dec. 23, 2010", 11 pgs.
"U.S. Appl. No. 12/119,249, Response filed Mar. 23, 2011 to Non Final Office Action dated Dec. 23, 2010", 10 pgs.
"U.S. Appl. No. 12/119,335, Notice of Allowance dated Jan. 13, 2011", 4 pgs.
"U.S. Appl. No. 12/119,335, Response filed Dec. 1, 2010 to Non-Final Office Action dated Sep. 1, 2010", 12 pgs.
"U.S. Appl. No. 12/119,407, Notice of Allowance dated Feb. 18, 2011", 7 pgs.
"U.S. Appl. No. 12/119,407, Response filed Dec. 9, 2010 to Non-Final Office Action dated Sep. 9, 2010", 17 pgs.
"U.S. Appl. No. 12/119,425, Non-Final Office Action dated Mar. 1, 2011", 17 pgs.
"U.S. Appl. No. 12/119,249, Examiner Interview Summary dated Oct. 5, 2010", 3 pgs.
"U.S. Appl. No. 12/119,249, Final Office Action dated Jun. 9, 2011", 15 pgs.
"U.S. Appl. No. 12/119,249, Response filed Oct. 10, 2011 to Final Office Action dated Jun. 9, 2011", 9 pgs.
"U.S. Appl. No. 12/119,350, Appeal Brief filed Oct. 28, 2010", 25 pgs.
"U.S. Appl. No. 12/119,350, Decision on Pre-Appeal Brief Request dated Sep. 28, 2010", 2 pgs.
"U.S. Appl. No. 12/119,350, Examiner's Answer to Appeal Brief dated Nov. 29, 2010", 15 pgs.
"U.S. Appl. No. 12/119,397, Final Office Action dated Oct. 28, 2011", 18 pgs.
"U.S. Appl. No. 12/119,397, Non-Final Office Action dated Jun. 23, 2011", 20 pgs.
"U.S. Appl. No. 12/119,397, Response filed Aug. 10, 2011 to Non Final Office Action dated Jun. 23, 2011", 9 pgs.
"U.S. Appl. No. 12/119,407, 312 Amendment filed Apr. 11, 2011", 3 pgs.
"U.S. Appl. No. 12/119,407, PTO Response to 312 Amendment dated Apr. 15, 2011", 2 pgs.
"U.S. Appl. No. 12/119,425, Final Office Action dated Aug. 19, 2011", 18 pgs.
"U.S. Appl. No. 12/119,425, Response filed Jun. 1, 2011 to Non-Final Office Action dated Mar. 1, 2011", 17 pgs.
"U.S. Appl. No. 12/119,350, Decision on Appeal dated Oct. 25, 2012", 5 pgs.
"U.S. Appl. No. 12/119,350, Response filed Dec. 26, 2012 to Final Office Action dated May 12, 2010", 11 pgs.
"U.S. Appl. No. 12/119,397 , Appeal Brief filed May 23, 2012", 17 pgs.
"U.S. Appl. No. 12/119,397 , Response filed Feb. 15, 2013 to Non Final Office Action dated Oct. 16, 2012", 10 pgs.
"U.S. Appl. No. 12/119,397, Final Office Action dated Jun. 7, 2013", 21 pgs.
"U.S. Appl. No. 12/119,397, Non Final Office Action dated Oct. 16, 2012", 20 pgs.
"U.S. Appl. No. 12/119,425, Appeal Brief filed Mar. 22, 2012", 16 pgs.
"U.S. Appl. No. 12/119,425, Examiners Answer dated Jul. 6, 2012", 24 pgs.
"U.S. Appl. No. 13/081,236, Non Final Office Action dated Jan. 24, 2012", 10 pgs.
"U.S. Appl. No. 13/081,236, Notice of Allowance dated Jun. 14, 2012", 9 pgs.
"U.S. Appl. No. 13/081,236, Response filed Apr. 24, 2012 to Non Final Office Action dated Jan. 24, 2012", 12 pgs.
"U.S. Appl. No. 13/081,267, Non Final Office Action dated Jul. 13, 2012", 6 pgs.
"U.S. Appl. No. 13/081,267, Notice of Allowance dated Nov. 9, 2012", 5 pgs.
"U.S. Appl. No. 13/081,267, Response filed Oct. 10, 2012 to Non-Final Office Action dated Jul. 13, 2012", 8 pgs.
Agarwal, Deborah, et al., "Supporting collaborative computing and interaction", Lawrence Berkeley National Laboratory, (May 22, 2002), 6 pgs.
Wiley, John, "Microsoft® Word 2007 Bible by Herb Tyson Publisher", (Mar. 12, 2007), 797-800.
U.S. Appl. No. 13/612,549, filed Sep. 12, 2012, Shared Edit Access of Electronic Content.
U.S. Appl. No. 13/749,079, filed Mar. 11, 2013, System and Method for Editing an Item List in Electronic Content.
"U.S. Appl. No. 12/119,397, Response filed Oct. 7, 2013 to Final Office Action dated Jun. 7, 2013", 12 pgs.
"U.S. Appl. No. 13/612,549, Non Final Office Action dated Oct. 25, 2013", 7 pgs.
"U.S. Appl. No. 13/612,549, Notice of Allowance dated Mar. 17, 2014", 5 pgs.
"U.S. Appl. No. 13/612,549, Response dated Jan. 29, 2014 to Non Final Office Action dated Oct. 25, 2013", 10 pgs.
"U.S. Appl. No. 13/794,079, Non Final Office Action dated Dec. 13, 2013", 7 pgs.
"U.S. Appl. No. 13/794,079, Response filed Mar. 6, 2014 to Non Final Office Action dated Dec. 13, 2013", 10 pgs.

\* cited by examiner

HISTORY-BASED ARCHIVE MANAGEMENT

BACKGROUND

In many fields of endeavour, the content of electronic documents is viewed, reviewed, and revised. Over the lifetime of a document, then, many revisions can occur. Some of these revisions are saved, creating an archive history of various versions of the document. Thus, as the number of document versions increases, so does the storage space used to maintain the revision history.

BRIEF DESCRIPTION OF DRAWINGS

Some embodiments are illustrated by way of example, and not limitation, in the figures of the accompanying drawings, in which.

DETAILED DESCRIPTION

Almost all word processing application programs operate to save the most current version of a document while it is being generated. Some of these applications permit saving prior versions as well, creating an archive of saved documents. The inventor has determined that the amount of archive storage can be more intelligently managed if some of the archived versions are automatically and selectively "pruned" or deleted from the archive. If pruning is accomplished according to the embodiments disclosed herein, the amount of archive storage devoted to each document, on average, should be reduced, while the utility of the archive can be enhanced via embedded information.

Figure 1:
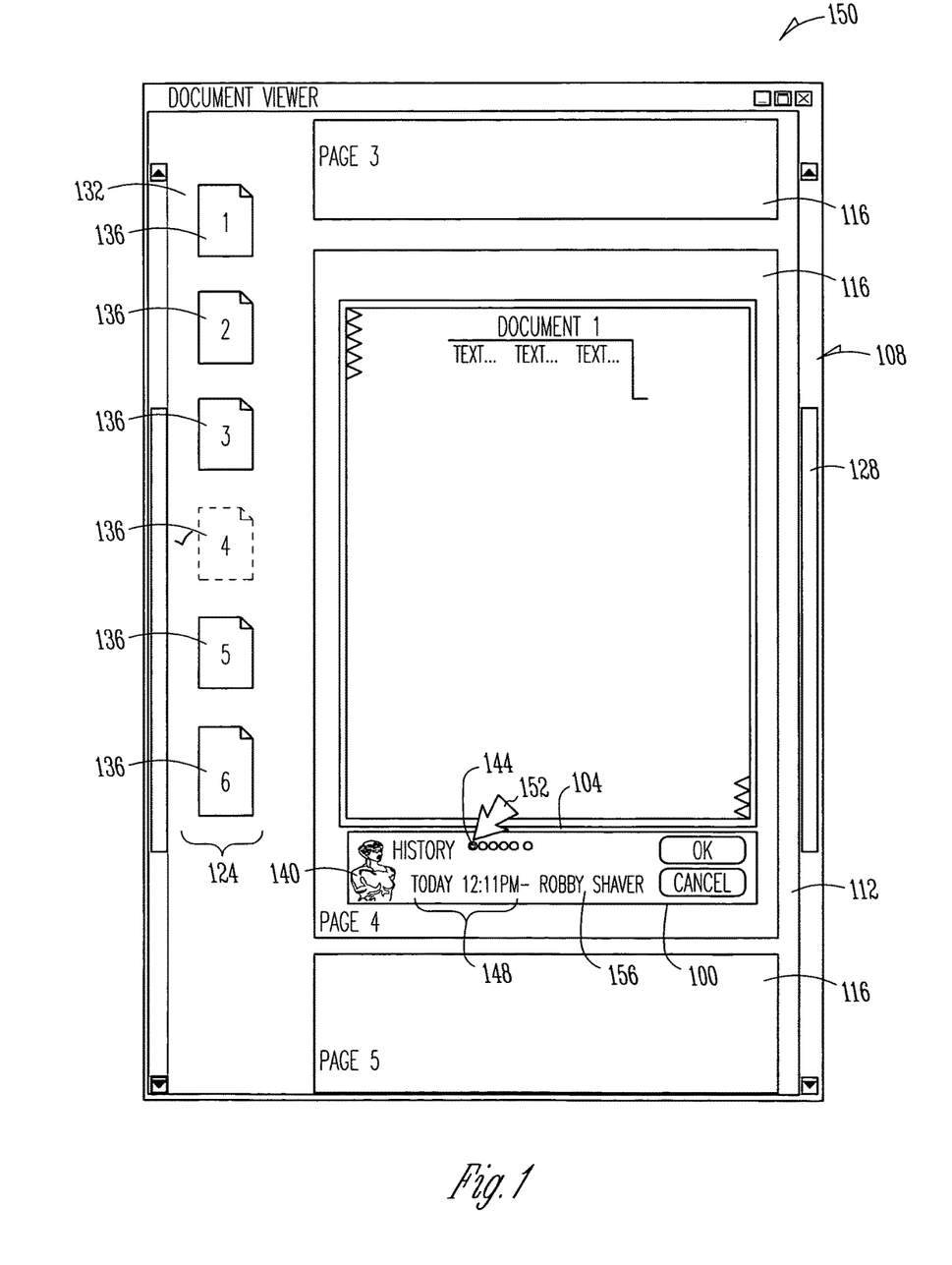
FIG. 1 illustrates the display of a file revision history along a time line as part of a graphical user interface (GUI), according to various embodiments.

FIG. 1 illustrates the display of a file revision history 100 along a time line 104 as part of a graphical user interface (GUI) 108, according to various embodiments. The GUI 108 shows an example of a GUI viewport 112 window that may be displayed by a reviewing application to present renderings of electronic content in the form of an electronic document 124 that includes several pages 116 of information 120.

The viewport 112 permits the reviewer to see only a portion of the document 124. As shown, all of one page 116 (page 4) and parts of other pages 116 (page 3 and page 5) are visible. On the right hand side of the GUI 108, a scroll bar 128 may be provided for a user/reviewer to scroll through renderings of the various pages 116 of the electronic document 124. The left hand side of the GUI 108 may include a reviewing pane 132 populated by thumbnail or iconic images 136 representing various pages in the electronic document 124.

In most embodiments, an end-user or "user" of a document processing application constructed to operate according to the principles disclosed herein can access previous versions of the document 124 (any version that is not the current version) by clicking on a history icon 140. The history icon 140 may form a part of the GUI 108 display associated with the document processing program, and can be located anywhere in the GUI 108, as desired. In most embodiments, the history icon 140 is located in the lower left or lower right corner of the screen 150.

Executing the command represented by the icon 140 has the effect of presenting a time line 104 of the most recent (current) version 144, and all past versions 148, to the user. In some cases, the current version 144 is shown as being selected at the far left of the time line 104, and as a mouse or other user-controlled pointing device is moved to hover a pointer 152 over each indicated version on the time line 104, a message 156 is displayed to show the identity of the person that created that version, and the time at which it was created (e.g., when it was saved). If the pointing device is "clicked" or otherwise made to indicate a selection, the particular version of the document selected (here, the current version) is presented for viewing.

It should be noted that in most embodiments, adding a comment to a document 124 does not operate to generate a new version of the document 124 when the document 124 is saved. Separate versions 144, 148 of a document 124 arise upon saving the document 124 when changes to the text or other content of the document 124 is made. Thus, in most cases, even though many people may have added comments to a document 124, there may be only one version of that particular document 124, assuming no other content in the document is changed.

Roles determine what changes a user can make to previous versions 148. In some embodiments, regardless of the role that a user maintains, no change can be made to any version of the document 144, 148 while the time line 104 is visible.

Persons having the role of "author" or "co-author" can make a previous version 148 of a document 144 the current, working version of the document 124—this is known as "reverting" to an earlier version. For example, in some embodiments, when a previous version 148 of a document 124 is being viewed, an author can indicate his desire to revert to that version, which then becomes the current version, and is thus made available for editing. The previous (current) version is retained as yet another version in the archive, and if desired, an author can revert to that version as the current version at any time—simply by accessing the document history and repeating the process just described. Users having the roles of "reviewer" or "reader" are not permitted to change anything with respect to a previous version 148 of a document.

All "collaborators" (users having the role of author, co-author, reviewer, or reader) can view any previous version 148 of a document 124, navigate through its content, copy from it, print it, search for a word or phrase in it, or use the "Save As" command to save the version as a new document. In some embodiments, collaborators are not permitted to replace text in prior versions 148.

In some embodiments, some or all prior versions 148 do not last forever. As more and more versions of a document are created, most embodiments operate to automatically prune previous versions 148 using a formula that takes into account a number of factors, sometimes including the age of the version, the amount of time that has elapsed between two versions, and the identity of the author for a particular version. Versions may be saved automatically, based on time, the level of activity, etc. Use of the "Save" command operates to save the document 124 without waiting for the automatic process to occur.

For the purposes of this specification, the term "electronic content" includes any digital data that may be presented to a user (e.g., visually or audibly presented), such as an electronic document, page-descriptive electronic content such as a page-descriptive electronic document, a media stream, a web page, a hypertext document, an image, digital video or a video recording, digital audio or an audio recording, animation, a markup language document, such as a hypertext markup language (HTML) or extensible markup language (XML) document, a form having blank components to accept entered data, or data describing the application of a GUI.

A "content element" includes any part of electronic content that is defined or discernable as a part. For example, a content element may be automatically discerned from a characteristic of the content element itself (e.g., a paragraph of an electronic document, or a file format designation) or may be manually defined by a user (e.g., a user-selected collection of words in an electronic document, a user-selected portion of a digital image). Examples of content elements include portions of a page-descriptive document or other electronic document, such as pieces of electronic text or other material within an electronic document, dynamic content in the form of portions of media streams, such as sections of digital video or frames or sets of frames of digital video or digital audio, dynamic content in the form of segments or frames of animations, electronic forms, form templates, form elements, form data, actuatable element specifications or executable instructions, and various elements presentable or accessible by users within electronic content, including instances of scripted and non-scripted dynamic content and the like.

The term "rendering" used as a verb includes presenting or making accessible electronic content or content elements to be perceived, viewed, or otherwise experienced by a user, or made available for further processing, such as, for example, searching, digesting, printing, analyzing, distilling, or transforming by computational processes that may not include processing the intrinsic data structure describing the electronic content or content element.

The term "rendering" used as a noun includes human-perceivable representations of data that is within a machine and perception-specialized organizations of data defining such representations. For example, a rendering may include a pattern of human-perceivable matter or energy presented on an output device (e.g., a display) by a machine, as well as the organization of data within a machine that defines such patterns. For example, such organizations of data may include the electronic configuration of a memory used by a graphics display processor, or a file containing an audio segment suitable for playing via an audio system of a computer.

The term "rendering module" may be taken to include systems, applications, and mechanisms for rendering or presenting electronic content to a user, including the presentation of content elements such as text, graphics, form element renderings and other electronic content elements. An example of a rendering module includes a web browser component (e.g., Microsoft Internet Explorer) or other component to render electronic content such as HTML pages. Another example of a rendering module includes the ADOBE® ACROBAT® electronic publishing program.

The term "rendering program" includes applications for rendering or presenting dynamic content to a user. An example of a rendering program is the ADOBE® FLASH® Player 9 runtime software application. In many embodiments, a rendering module interacts with a rendering program to render dynamic content.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). Modules may include hardware circuitry, optical components, single or multi-processor circuits, memory circuits, software program modules and objects, firmware, and combinations thereof, as appropriate for particular implementations of various embodiments. The term "module" includes an identifiable portion of code, data, or a computational object to achieve a particular function, operation, processing, or procedure.

It is common for one or more users (or other actors, such as automated processes) to view, review, and revise electronic content. In some embodiments, a review may be carried out by one person or by a team including multiple persons.

When viewing, reviewing, or revising, a user may start up an application (e.g., a rendering module) to render or otherwise present electronic content. This electronic content may take a variety of forms such as an electronic document, an audio file, video file, sequence of images, dynamic content, combinations thereof, and other forms of electronic content.

During the course of the activity, the user may be presented with a rendering of various content elements (e.g., using an output device, such as a display) included or otherwise associated with the electronic content. In some embodiments, these content elements may be presented in a sequential order so as to indicate their positions or interrelationships within the electronic content, or for ease of user perception.

Various types of content elements contained within electronic content may be presented to a user on an output device in various ways according to the nature of the content elements and/or the preferences of users. For example, electronic content representing an electronic document may be presented on a display screen in the form of renderings of pages as they might appear if the electronic document were to be printed out. In some such embodiments, the user may use a mouse, keyboard, touch pad, voice input or other input devices to explore the electronic document. The application may provide such affordances as scroll bars, fast forward/reverse scan buttons, or other GUI elements to be manipulated by the user to carry out exploration of the electronic document. This exploration may be used when the entire electronic document is too large to conveniently display on a computer screen at one time.

While reviewing or revising electronic content that includes content elements, the user may wish to record or otherwise keep track of a particular state of revision. One way of tracking this state is by saving a version of the electronic content, and adding it to the archive history 100. It is the management of these versions of stored content forming the archive history 100 that is directly addressed by the various mechanisms described herein.

As a document 124 is edited, versions 144, 148 can be saved locally, or on a server. Each version is a snapshot of the entire document 124, including merged comments from reviewers. Saving the document 124 can be triggered either by an explicit "save" command from a user, by an application program auto-save mechanism which is not controlled by the user, or by a "revert" command when there are pending unmerged comments.

Old versions 148 of the document 124 are periodically pruned. In some embodiments, a document 124 can be marked to make it immune to pruning, so that the marked version is saved, in essence, forever—at least until it is unmarked, and pruning is thereafter permitted. As noted previously, in some embodiments, the addition of a comment by a reviewer does not trigger a save operation. However, such comments are incorporated into the main document 124 whenever it is saved.

The GUI 108, which may comprise a client GUI, supports reviewing the content of old or prior versions 148 and reverting to one of them. Reversion is implemented by copying the content of the old version into the latest (current) version 144. Intermediate versions, i.e. those between the old version and the latest version, are therefore still accessible, unless they are pruned.

Each time a document's contents 120 are saved (explicitly or via auto-save), they are saved as a new version, rather than overwriting the previous version. In most embodiments, versions are maintained in the archive history along with the date-time when they were saved (created), and the identity of the user who saved them.

Pruning may be implemented as a batch task to delete some of the versions from the archive history 100 so that the granularity in time becomes finer for versions having a more recent date-time of creation. Pruning may operate so that the interval between saved versions 144, 148 becomes larger the farther back in time a particular version was created.

For example, all versions less than one hour old might be kept, with only one version per hour kept for versions between one hour and twenty-four hours old. One version per day may be kept for versions between one day and one week old, with one version per week kept for versions between one week to four weeks of age, with no versions kept that are older than four weeks. Many other variations are possible.

Thus, in many embodiments, pruning operates to eliminate versions where the interval between them is relatively short in relation to their creation date-time and the current date-time. In some embodiments, more weight is given when proximate revisions are saved by different authors—reducing the likelihood of pruning both versions. In some embodiments, pruning is based on the age of a particular revision with respect to the current revision date-time, so that a document which ages without further editing will gradually lose versions in the archive until only the most recent version is retained.

Figure 2:
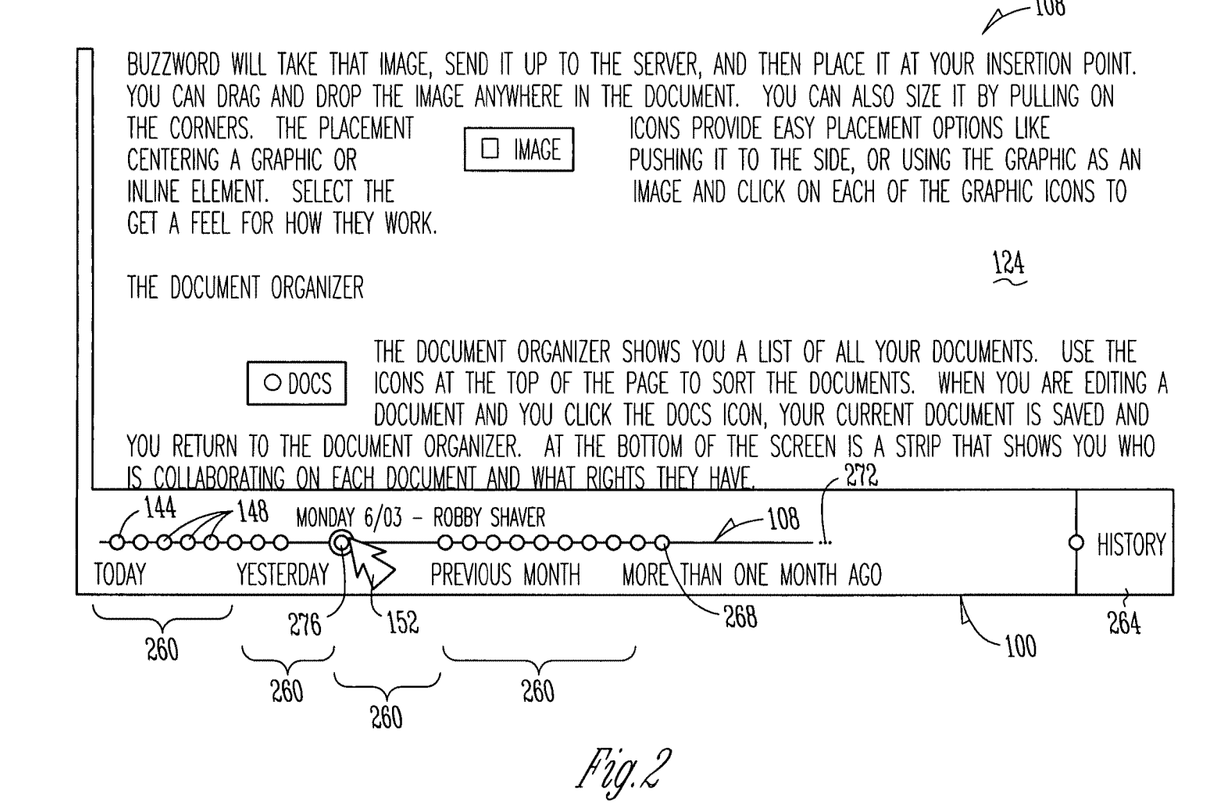
FIG. 2 illustrates a file revision history along a time line with time segments as part of another GUI, according to various embodiments.

FIG. 2 illustrates a file revision history 100 along a time line 104 with time segments 260 as part of another GUI 208, according to various embodiments. When a document 124 is opened, the most recent (current) version 144 is retrieved. However, a set of stored (prior) versions 148 is accessible via the time line 104 component that may be presented as sliding out from the lower-left or lower-right corner of the viewing area in some embodiments. The presentation of the time line 104 may be triggered by selecting a "history tab" 264. The time line 104 can also be made visible with a "View" command, followed by a "History" command.

Upon entry into the time line presentation mode, any unsaved changes are automatically saved by the document processing application program. While in the time line presentation mode, document updates are not displayed. When the time line 104 is opened for presentation, documents 124 are available in read-only mode. No user is permitted to make changes to the document 124 until the time line presentation mode is terminated.

The history bar 100 can be organized by time buckets, or segments 260, with the most recent on the left side of the time line 104, with each segment 260 containing an indication of one or more versions. Segments can be arranged with the most recent version located on the left side, moving to the oldest version on the right, or in other ways. If a segment 260 has no versions, it is not displayed.

A version within a segment 260 can be indicated by a dot (as shown in FIG. 2), a circle, or some other graphic figure used as a version indicator 268. The indicator 268 may have a color associated with the user whose work was saved in that version. The color may refer to a color assigned to each user in a document sharing list. If a particular version was saved by a user no longer present on the document sharing list, the indicator 268 may have a gray color.

Indicators 268 on the time line 104 may be evenly spaced, so that there is no attempt to scale the spacing to match the amount of time between save dates. Each segment 260 may be wide enough to accommodate a label, e.g. "Last Week", growing horizontally as needed to accommodate the number of version indicators 268 present in that segment. There are many potential segment labels that can be used, such as "today", "yesterday", "this week", "last week", "this month", "last month", "this year", "last year", "before that", etc.

If there are not enough indicators 268 to fill out a designated minimum segment width, then the remainder of that segment 260 on the time line 104 may be displayed as empty. In some embodiments, the length of segments 260 are scaled according to their relation to each other in time (e.g., longer segments represent a longer period of time than is represented by those segments that are shorter in length). In some embodiments, the locations of the indicators 268 within a segment 260 are scaled along the time line 104 according to their relation to each other in time (e.g., greater spacing between indicators 268 equates to greater spacing in time between the corresponding saved versions of the document 124).

The end 272 of the time line 104 that includes indicators for the older versions of the document 124 may be presented as a fading image, or as a clipped line (not shown) if the viewing area doesn't accommodate a normal page width. However, in most cases, the history tab 264 remains visible so that selecting it may be used to hide the history bar 100. Rolling over or hovering a pointer 152 (e.g., a mouse pointer) over the indicator 276 for a particular version expands the indicator 276 and shows summary information about the version just above the time line 104, as noted previously.

If a version is selected by virtue of an action on the part of the user (e.g., the mouse controlling the pointer 152 is clicked), then the version selected replaces the current version of the document 124 displayed in the GUI 108. Selected areas and scrolling are maintained, if possible.

Once any version other than the current version 144 is selected for viewing, the document 124 is presented in "time-machine mode": it is read-only, but can be freely browsed. More specifically, permissions with respect to altering the document 124 are like those afforded to the role of a reader: no changes can be made, but operations such as "Find", "Copy", and other read-only operations are permitted. If the user does attempt to edit a previous version that has been selected, an error message is displayed. The message displayed is distinct from the usual read-only access case, such as when a user with the role of reader attempts to modify the current version of a document.

If there are unsaved changes made to the document 124 before time-machine mode is entered, they are saved. If there are unmerged comments and the user is an author or co-author, the document 124 is saved automatically.

In time-machine mode, several options exist: another version of the document 124 may be selected for viewing using the history bar 100; an exit may be effected, to return to the current version (e.g, by clicking on the history tab 264); or the selected version may be saved as another named document by using the "File" and "Save As" menu commands. In this case, the history tab 264 will be closed, since the new document has no version history.

In the time-machine mode, another available option is that of reversion. As mentioned previously, the selected prior version may be saved as the most recent version. In this case, previous versions are still available, so the user can change his mind later and revert to the original (current) version or some other version. The "revert" option is available only to users with the role of author or co-author. For others, closing the history bar causes the most recent revision of the document to be reopened. Thus, after electing any of these options, the time-machine mode is terminated, unless another version is selected for viewing from the history bar 100.

The list of versions may change while a user is in time-machine mode. For example, another user may save a new version, or pruning may occur automatically. The history bar 100 list of versions may not be automatically updated during any given time-machine session. When time-machine mode is entered, the history bar 100 is populated with the then-current list of versions. If a new version is subsequently created, it may not be shown. If a user chooses a non-existent version, an error message is presented, and the list of versions on the history bar 100 is refreshed. If a new version has been added since opening the history bar 100, the revert operation is disallowed and a dialog appears explaining that this version of the current document is now old.

Sharing list information, indicating which users are permitted to share in viewing, review, and revision of the document 124, is not saved when changes are made, or "versioned". Reverting to an earlier document does not change the sharing list. When a document is saved using a "save as" command in time-machine mode, the new document is owned by the current user, and no other users are permitted to share until explicit permission is granted by the current user. Similarly, the title of a document is not versioned.

When a user deletes a document, all the versions associated with it are also deleted. When a user renames a document, the versions continue their attachment to the renamed document. However, when the user saves a document using a "Save As" command, the new document begins a new version history. No association with the original document is maintained.

Previous versions are available to all members of the sharing list associated with a document. However, the members can only access versions which have been created since the time they were granted access to the document, regardless of their role. The time of membership begins when the invitation to become a member of the sharing list is accepted.

Pruning can be accomplished in many different ways. The essence of the process is to examine each version of a given document, starting from the most recent version (which is assumed to be the current version). The first action is to find the next most recent (unpruned) version. If there is none, such that the next most recent version is the same as the current version (i.e., there is only one version), nothing is pruned, and the activity ends.

Otherwise, if more than one version exists, the version older than the current version is designated as the "Target" version, and the version that is more recent than the Target version is designated as the "Next" version. These two version are "proximate in time", meaning that no other versions lie in between them with respect to the time that they were saved.

At this point, two differential time periods are determined: the time difference between now and the creation time of either the Next or Target versions (Taged), and the time difference between the creation times of the Next and Target versions (Tprox). The values Taged and Tprox are then examined.

If Tprox is less than some specified fraction FRAC of Taged, then the Target version is pruned. This method tends to save more of the recent document versions, and to more actively prune older versions. For example, there is likely more interest in versions spaced a few minutes apart that have been edited in the last hour, when such versions are several months old. In that case, versions saved days or weeks apart will likely be more useful.

Thus, in some embodiments, a sliding scale may be implemented, and weight may be afforded to versions having different users. Consider the sliding scale presented in Table I, with a cutoff of one week. Here a Target version is chosen (which can be any one of the versions, including the oldest version, but not the current version), as well as a Next version, which is the next most recent version (i.e., newer than the Target version). Then, take Taged=either one of [time-date(now)−time-date(Next)] or [time-date (now)−time-date(Target)]. Tprox=time-date(Next)−time-date(Target). If the Next and Target versions are saved by different users, then take Tprox=Tprox*100, where 100 is the weighting factor used for different authors. Of course, any desired weighting factor can be used. Then, pruning can be implemented according to the conditions shown in Table I.

TABLE I

| If Taged is Less Than . . . | And if Tprox is Less Than . . . | Prune Target? |
| --- | --- | --- |
| 10 minutes | Don't Care | NO |
| 60 minutes | 5 minutes (FRAC = 1/12) | YES |
| 3 hours | 10 minutes (FRAC = 1/18) | YES |
| 1 day | 15 minutes (FRAC = 1/96) | YES |
| 1 week | 1 hour (FRAC = 1/168) | YES |
| If Taged ≥ one week | 1 day (FRAC = 1/7) | YES |

Whether pruning of the Target version occurs, or not, one can move on to the next-older version (older than the Target version), and this next-older version becomes the new Target version. If pruning has occurred, the Next version stays the same, and the pruning analysis process can be repeated with the same Next version and the new Target version.

If no pruning of the Target version occurs, then the unpruned Target version becomes the new Next version, and the next-older version with respect to the previous Target version becomes the new Target version, and the pruning analysis process can be repeated with the new Next version and the new Target version.

The sliding scale is implemented in this example for Taged from 60 minutes to 1 week. It should be noted that at the one week cutoff (the last table entry), because there is no pruning if Tprox is greater than or equal to one day, one version per day will be retained after the cutoff period of one week. Thus many embodiments may be realized.

Figure 3:
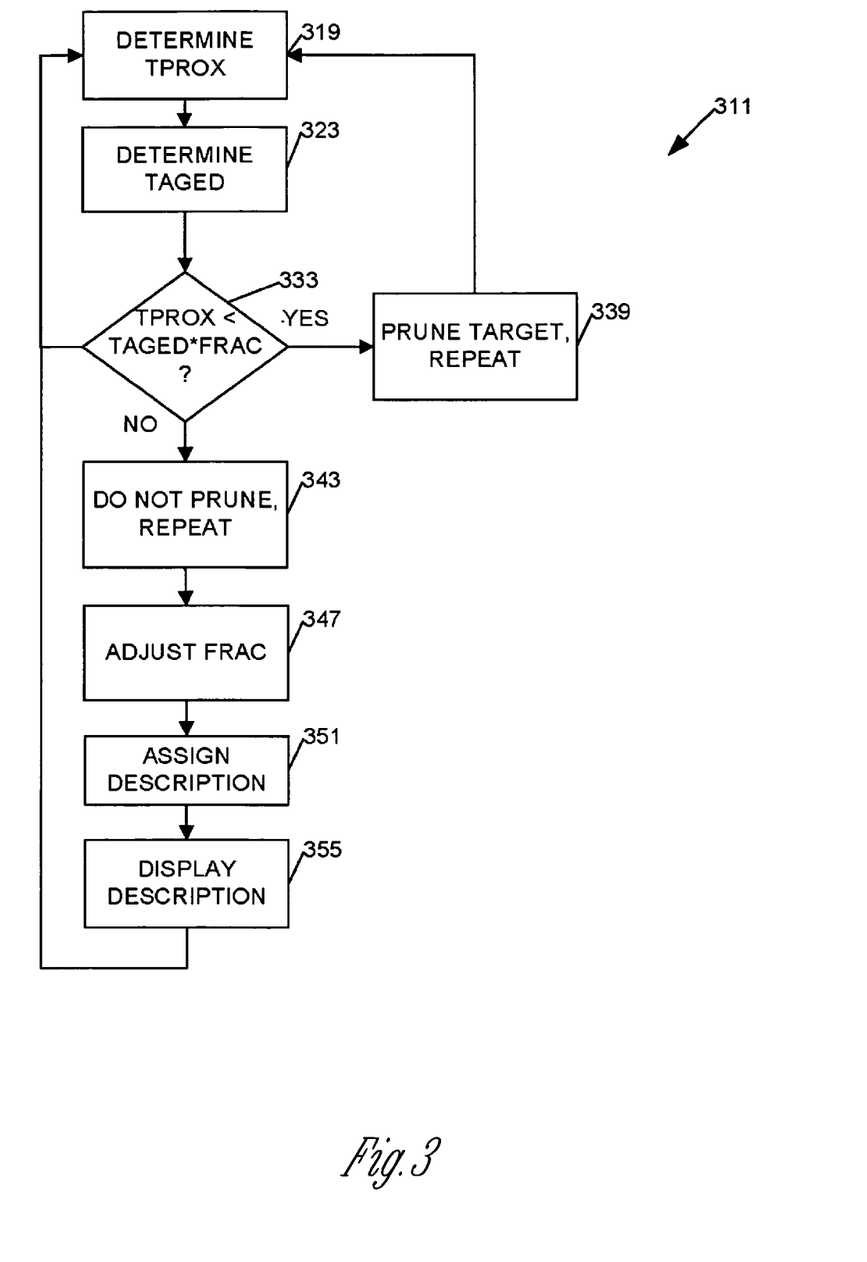
FIG. 3 is a flow diagram illustrating several methods according to various embodiments.

For example, FIG. 3 is a flow diagram illustrating several methods 311 according to various embodiments. In some embodiments, a method 311 of pruning versions of electronic content may begin at block 319 with determining a proximate save time difference (e.g., Tprox) between two versions of electronic content: the Next version and the Target version, wherein the Target version is older in time than the Next version, as described above. That is, the proximate save time difference is the difference in time between when the next oldest version was saved, and the oldest version was saved, wherein the next oldest version and the oldest versions are proximate in time.

The electronic content may comprise a document, text, drawings, audio recordings, video recordings, multimedia presentations, etc. Any documents may be organized according to a page descriptive format, which includes a portable document format, where "portable document format" means a device-independent and display resolution-independent fixed-layout document format, including the text and fonts, images, and graphic paths associated with the document. The format may comprise a representation of a two-dimensional document, or a three-dimensional document. An example of a commercially available portable document format (PDF) is the format described in "PDF Reference", sixth edition, ADOBE® Portable Document Format, Version 1.7, November 2006.

The method 311 may continue on to block 323 with determining an aged save time difference (e.g., Taged) between the current time and one of the oldest version, or the next-oldest version (e.g., the difference between now and the save time of the Next version or the Target version). In this way, different embodiments may use a different aging standard, as desired.

At this point, the method 311 may continue on to block 333, with determining whether the proximate save time difference is less than a fraction of the aged save time difference (e.g., 5%, 10%, 20%, etc. of Taged). If so, then the method 311 may include, at block 339, pruning the Target version of the electronic content from a plurality of revisions of the electronic content if the proximate save time difference is less than a selected fraction of the aged save time difference. The activity at block 339 may include repeating determining the proximate save time difference and determining the aged save time difference, wherein the Next version of the electronic content remains as the Next version of the electronic content if the Target version of the electronic content is pruned. Thus, in some embodiments, if pruning occurs, the Next document version remains to set the same aging standard.

In some embodiments, the method 311 may continue on to block 343, when it is determined that the proximate save time difference is not less than a fraction of the aged save time difference at block 333. In this case, the Target version of the document is not pruned, and the method 311 includes repeating determining the proximate save time difference and determining the aged save time difference, wherein the Target version of the electronic content becomes the Next version of the electronic content if the Target version of the electronic content is not pruned. Thus, in some embodiments, if no pruning occurs, the unpruned Target document becomes the new aging standard (i.e., the new Next document).

The method 311 may include, at block 347, reducing the value of the selected fraction according to a reduction in value of the aged save time difference. That is, the fraction of the aged time difference can be reduced as the magnitude of the aged time save difference is reduced. In some embodiments, the reduction in the fraction might be in approximately direct proportion to the reduction in the magnitude of the aged save time difference, or in some other proportion.

In some embodiments, reduction of the fraction may include reducing the value of the selected fraction according to a sliding time scale having a fixed cutoff value, as shown by example in Table I. In this way, the fraction can be adjusted so that older versions will be relatively far away from each other in time than more recent versions in order to avoid being pruned.

The method 311 may continue on to block 351, comprising assigning a description to one or more of the unpruned revisions. Descriptions may include an image, a descriptive phrase, the name of the author or identity of the user saving that version, the time the version was saved, etc.

The method 311 may include, at block 355, displaying the description along with an indication of the unpruned version and a history of some of the plurality of revisions along a time line. Indicators may comprise a series of dots or other symbols, as described previously. Thus, the method 311 may include, at block 355, displaying a history of a group of versions along a time line as part of a GUI. Many other embodiments may be realized.

Figure 4:
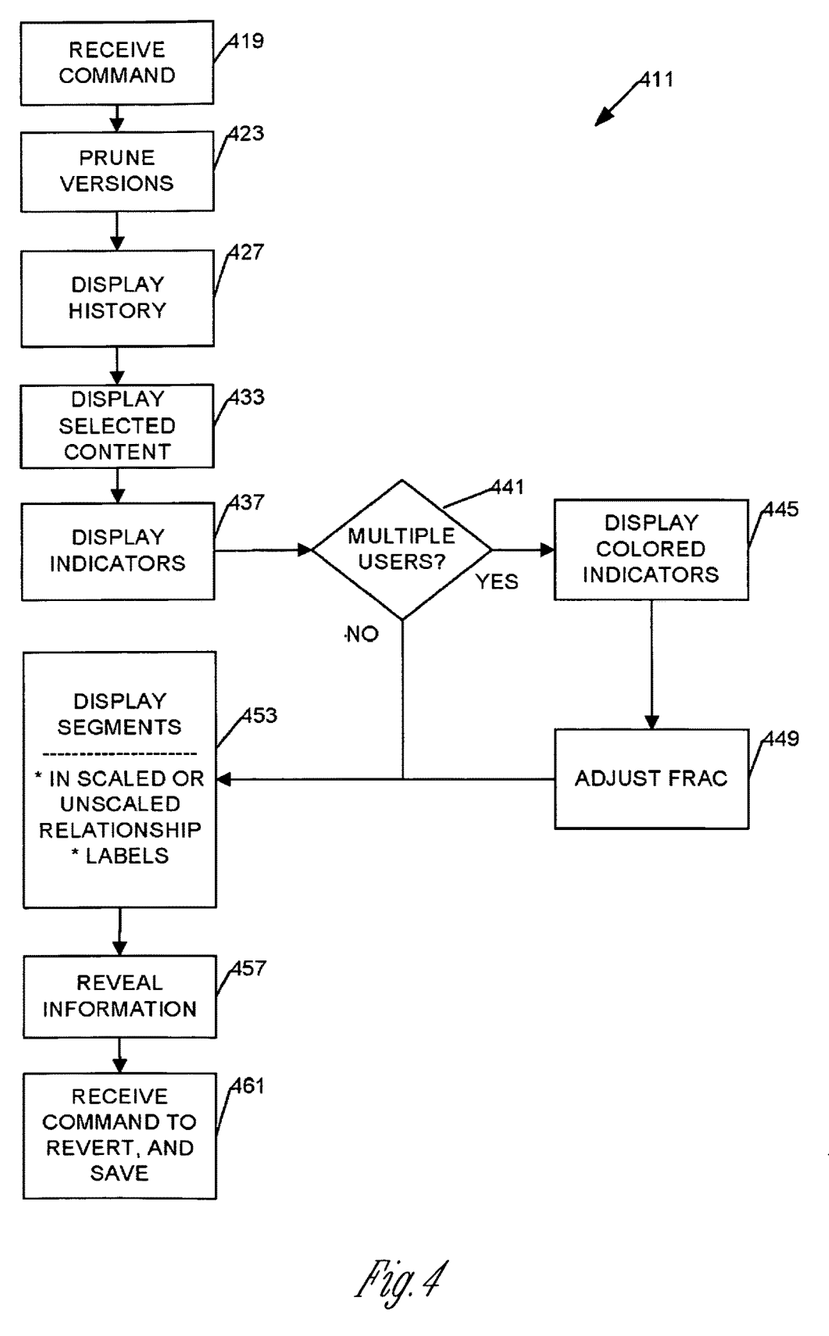
FIG. 4 is a flow diagram illustrating several additional methods according to various embodiments.

For example, FIG. 4 is a flow diagram 411 illustrating several additional methods according to various embodiments. For example, a method 411 of displaying electronic content version history may begin at block 419 with receiving a command to prevent one or more of the versions selected from a plurality of electronic content revisions from being pruned. This command might be used, for example, when saving a benchmark, or a legal document that has value because of its content as of a certain date-time.

The method 411 may go on to block 423 to include pruning versions of electronic content revisions from the plurality of electronic content revisions to select a group of unpruned versions. Pruning may occur in any of the ways described previously.

The method 411 may go on to include, at block 427, displaying a history of the group of unpruned revisions along a time line as part of a GUI. In some embodiments, the history is displayed before pruning occurs, and in others, after pruning occurs. In some embodiments, the history is displayed both before and after pruning occurs.

The method 411 may include, at block 433, displaying electronic content included in a selected one of the group of unpruned revisions. The method 411 may continue with block 437 to include displaying an indicator for each one of the group of unpruned revisions on the time line.

If it is determined at block 441 that multiple users are included in the sharing list for a displayed document, then the method 411 may include, at block 445, displaying a colored indicator for each one of the group of unpruned revisions on the time line, wherein the color of the indicator in each case corresponds to the identity of the user that saved the corresponding member of the group. In this way, colored indicators can be used to show which user saved which version of the document.

When multiple users exist, the pruning fraction may be weighted accordingly. Thus, the method 411 may include adjusting the selected pruning fraction at block 449 based on the identity of a user that saved the Target version, if the user that saved the Target version is different from a user that saved the Next version, for example.

In some embodiments, the method 411 may include displaying the time line to include a series of equal time segments, or unequal time segments, or some combination of these at block 453. For example, the display of time segments may include displaying at least some unequal time segments in scaled temporal relationship with each other, so that the length of the segments is scaled according to their relationship in time (e.g., a one day segment is one-seventh as long as a one week segment).

Thus, the method 411 may include, at block 453, displaying a history of a group of versions along a time line as part of a GUI. The time line may be displayed to indicate at least some members of the group in unscaled temporal relationship with each other. The time line may also be displayed to indicate a series of unequal time segments, wherein each of the unequal time segments is labeled to indicate its respective span of time.

The method 411 may go on to block 457 to include revealing additional information about one of the group on the time line when a cursor of the GUI hovers over an indicator on the time line corresponding to one of the group. Thus, for example, a mouse-over action on an indicator located on the time line can be used to display more information about a particular version. If the indicator is selected by an action on the part of the user (e.g., a mouse click), the method 411 may go on to block 461 to include receiving a command to revert to a previous version in the group, wherein the previous version is older than the most recent version, and saving the previous version as the most recent version.

It should be noted that the methods described herein do not have to be executed in the order described, or in any particular order. Moreover, various activities described with respect to the methods identified herein can be executed in iterative, repetitive, serial, or parallel fashion. Activities within various methods may also be combined, to include combination across the various figures used herein. Information, including parameters, commands, operands, and other data, can be sent and received in the form of one or more carrier waves.

Figure 5:
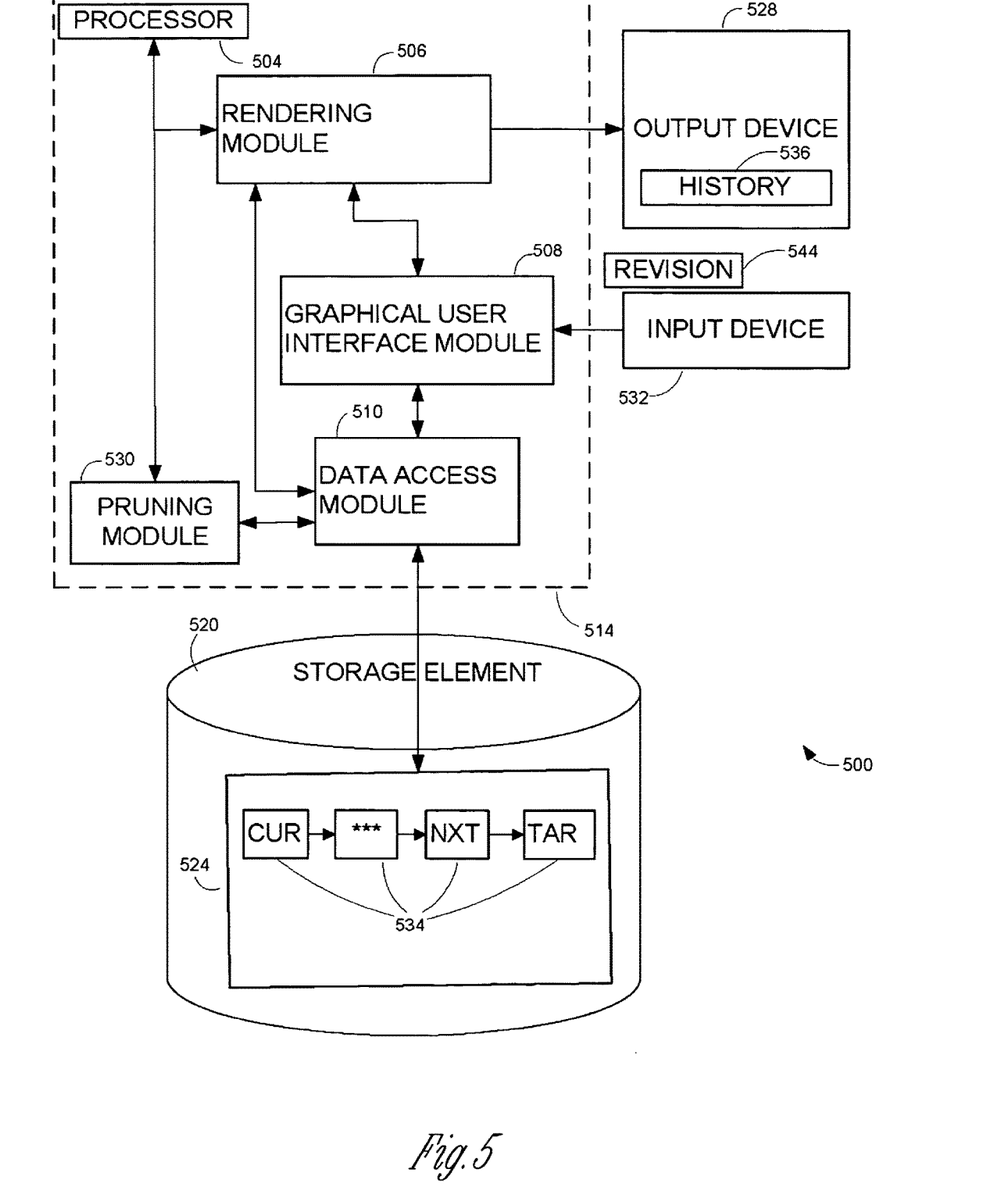
FIG. 5 is a block diagram of apparatus and systems according to various embodiments.

FIG. 5 is a block diagram of a system 500 according to various embodiments. The system 500 may include a number of modules such as one or more processors 504, a rendering module 506, a GUI module 508 and a data access module 510. The rendering module 506 and the GUI module 508 may take the form of an integral module, or exist a separate modules, as shown. A pruning module 530 may also be included. These modules may be associated within a machine 514, such as a personal digital assistant (PDA), laptop, personal computer, workstation, or server, as indicated by their containment within the dashed box.

In order to avoid obscuring the components of FIG. 5, connecting lines between each of the elements within the machine 514 have not been shown. However, those of ordinary skill in the art will understand that any of the individual elements shown to be located within the confines of the machine 514 may be operably coupled to any other element within the machine 514. Similarly, those of ordinary skill in the art will understand that any of the components shown to be located within the confines of the machine 514 may also be located outside the machine 514, and appropriately coupled to the machine 514 via wired or wireless networks or other interface mechanisms.

The data access module 510 may be used by the rendering module 506 to access a storage element 520, such as a database, a memory, a disk, or other storage device. The storage element 520 may serve to contain one or more items of electronic content 524, such as electronic documents 534. The data access module 510 may operate to read from and/or write to the electronic content 524 and may provide reading and writing services for the benefit of other system modules, including the GUI 508, the rendering module 506, the processor 504, the rendering program 530, and the pruning module 530. The electronic content 524 may include one or more content elements 534, such as various versions of a document, including the current version CUR, the penultimate version PEN, and the ultimate version ULT.

The data access module 510 may be present in some embodiments, and absent in others. When present, the data access module 510 may operate as a mediator between the various components of the system 500 and the electronic content 524. For example, the storage element 520 may be included in a remote server.

The rendering module 506 may be operably coupled to an output device 528, such as a display screen, printer, or loudspeaker, among others. This output device 528 may be used for presenting renderings of content elements 534. Rendering may take the form of displaying the content elements 534, including a history bar 536 with a timeline, as shown in FIGS. 1-2.

A GUI module 508 may be operably connected to the rendering module 506 and the data access module 510. The rendering module 506 may comprise a portable document format processing program in some embodiments.

The GUI module 508 may receive input from input devices 532 (e.g., a keyboard, a mouse, a trackball, voice recognizer, touch pad, touch screen, etc.), including user input comprising a "Save" command to save a revision 544 of a document in response to the GUI presented by an electronic content reviewing application. Thus, many embodiments may be realized.

For example, a system 500 to display electronic content version history may comprise an output device 528 in the form of a display, and a pruning module 530 to prune versions of electronic content revisions from a plurality of electronic content revisions to select a group of unpruned versions of the electronic content. Pruning may occur in any of the ways described previously. The system 500 may also include a rendering module 506 to display a history 536 of the group along a time line as part of a GUI on the display. In some embodiments, the system 500 includes a user input device 532 to select a selected one of the group of unpruned versions for display in a time-machine mode that prevents changing any part of the selected one unless it is the most recent version.

Figure 6:
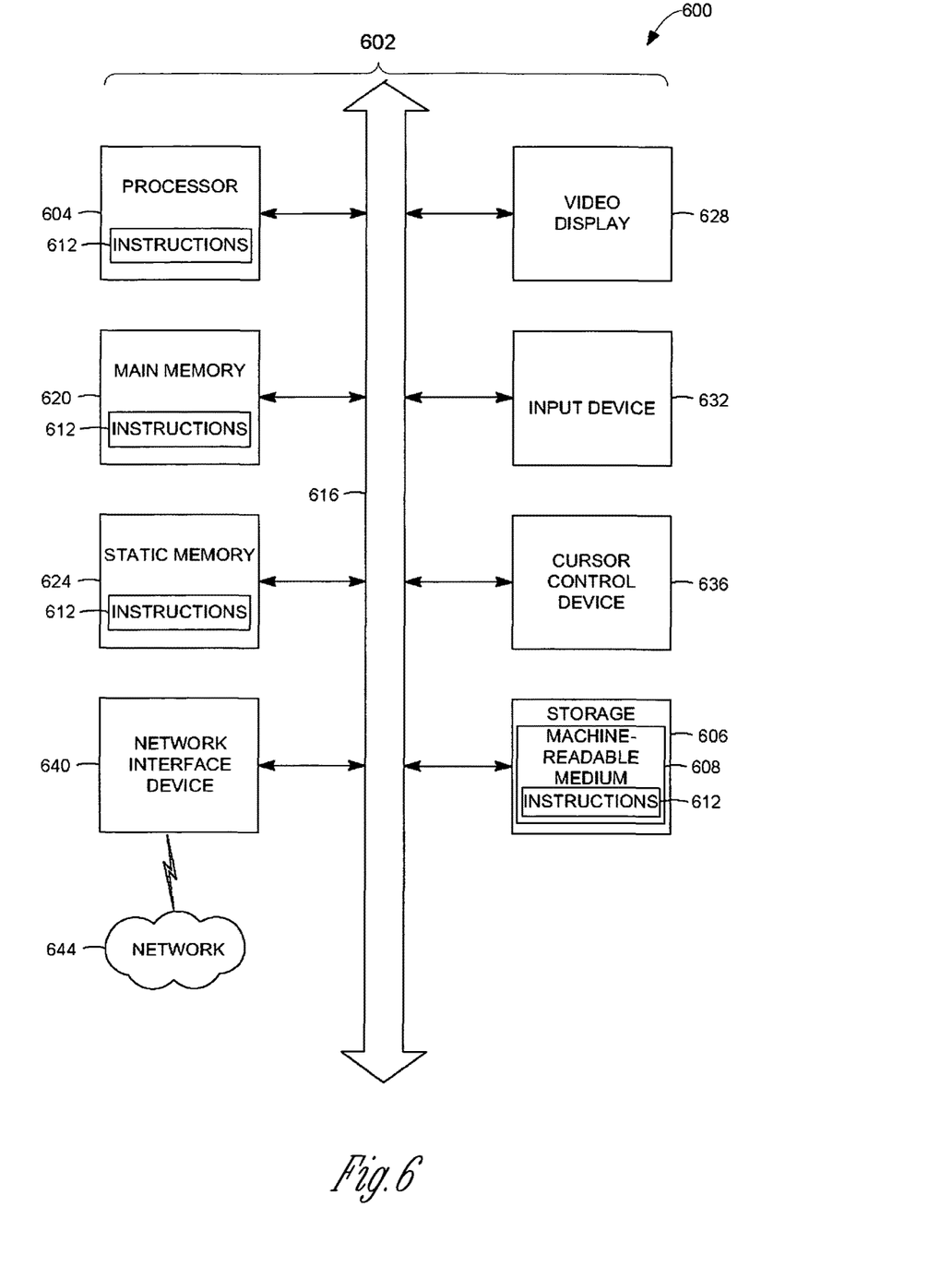
FIG. 6 is a block diagram of an article of manufacture, including a machine, according to various embodiments.

FIG. 6 is a block diagram of an article 600 of manufacture, including a machine 602, according to various embodiments. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or inter-process communication techniques, including remote procedure calls. The teachings of various embodiments are not limited to any particular programming language or environment.

Thus, other embodiments may be realized. For example, an article 600 of manufacture, such as a computer, a memory system, a magnetic or optical disk, some other storage device, and/or any type of electronic device or system may include one or more processors 604 coupled to a machine-readable medium 608 such as a memory (e.g., removable storage media, as well as any memory including an electrical, optical, or electromagnetic conductor) having instructions 612 stored thereon (e.g., computer program instructions), which when executed by the one or more processors 604 result in the machine 602 performing any of the actions described with respect to the methods above.

Machine 602 may take the form of a computer system having a processor 604 coupled to a number of components directly, and/or using a bus 616. Thus, the machine 602 may be similar to or identical to the system 500 shown in FIG. 5.

Turning now to FIG. 6, it can be seen that the components of the machine 602 may include main memory 620, static or non-volatile memory 624, and mass storage 606. Other components coupled to the processor 604 may include an output device 628, such as a video display, an input device 632, such as a keyboard, and a cursor control device 636, such as a mouse. A network interface device 640 to couple the processor 604 and other components to a network 644 may also be coupled to the bus 616. The instructions 612 may further be transmitted or received over the network 644 via the network interface device 640 utilizing any one of a number of well-known transfer protocols (e.g., HTTP). Any of these elements coupled to the bus 616 may be absent, present singly, or present in plural numbers, depending on the specific embodiment to be realized.

The processor 604, the memories 620, 624, and the storage device 606 may each include instructions 612 which, when executed, cause the machine 602 to perform any one or more of the methods described herein. In alternative embodiments, the machine 602 operates as a standalone device or may be connected (e.g., networked) to other machines. In a networked environment, the machine 602 may operate in the capacity of a server or a client machine in server-client network environment, or as a peer machine in a peer-to-peer (or distributed) network environment. The machine 602 may be a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine 602 is illustrated, the term "machine" shall also be taken to include any collection of machines that individually or jointly execute a set (or multiple sets) of instructions to perform any one or more of the methodologies discussed herein.

While the machine-readable medium 608 is shown as a single medium, the term "machine-readable medium" should be taken to include a single medium or multiple media (e.g., a centralized or distributed database, and/or associated caches and servers, and or a variety of storage media, such as the processor 604 registers, memories 620, 624, and the storage device 606) that store the one or more sets of instructions 612. The term "machine-readable medium" shall also be taken to include any medium that is capable of storing, encoding or carrying a set of instructions for execution by the machine and that cause the machine 602 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Implementing the apparatus, systems, and methods of the various embodiments may provide the ability to allocate storage to various versions of a document more efficiently. In addition, using the history bar and timeline described herein may provide a more effective collaboration environment when multiple authors work together to produce a single document.

Although embodiments of the invention have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those of ordinary skill in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A computer implemented method, comprising:
   determining a proximate save time difference between a save time of a target version of electronic content and a save time of a next version of the electronic content, the save time of the target version being older in time than the save time of the next version, and proximate in time to the save time of the next version, the target version of the electronic content and the next version of the electronic content being saved versions of a plurality of revisions of the electronic content, the target version and next version being stored in an archive history;
   determining an aged save time difference between a current time and one of the save time of the target version or the save time of the next version of the electronic content, the current time being different in time from the save time of the target version and the save time of the next version of the electronic content; and
   pruning the target version of the electronic content from the plurality of revisions of the electronic content stored in the archive history based on the proximate save time difference and the aged time difference, the pruning comprising:
      determining which one of a plurality of specified time periods the aged save time difference is associated with;
      for the determined time period, determining whether the proximate save time difference is less than a corresponding threshold for the determined time period; and
      pruning the target version of the electronic content based on the proximate save time difference being less than the corresponding threshold.

2. The method of claim 1, wherein the electronic content comprises a document.

3. The method of claim 2, wherein the document is organized according to a page descriptive format.

4. The method of claim 1, comprising:
   repeating determining the proximate save time difference and determining the aged save time difference, the target version of the electronic content becoming the next version of the electronic content if the target version of the electronic content is not pruned.

5. The method of claim 1, comprising:
   repeating determining the proximate save time difference and determining the aged save time difference, the next version of the electronic content remaining as the next version of the electronic content if the target version of the electronic content is pruned.

6. The method of claim 1,
   wherein the corresponding threshold for the determined time period is a fraction of the determined time period.

7. The method of claim 6, wherein the
   fraction of the determined time period is smaller than a fraction of a next larger time period.

8. The method of claim 1 comprising:
   assigning a description to an unpruned one of the plurality of revisions.

9. The method of claim 8, comprising:
   displaying the description along with an indication of the unpruned one and a history of some of the plurality of revisions along a time line.

10. A computer implemented method, comprising:
    pruning versions of electronic content revisions from a plurality of electronic content revisions to select a group of unpruned versions of the electronic content, the plurality of electronic content revisions being previously saved, the pruning comprising:
       determining a proximate save time difference between a target version of the plurality and a next version of the plurality of electronic content revisions, the target version and next version being stored in an archive history;
       determining an aged save time difference between a current time and one of the target version of the plurality or the next version of the plurality, the current time being different in time from the save time of the target version and the next version of the plurality of electronic content revisions, and
       pruning the target version from the plurality of electronic content revisions stored in the archive history based on the proximate save time difference and the aged time difference, the pruning comprising:
          determining which one of a plurality of specified time periods the aged save time difference is associated with;
          for the determined time period, determining whether the proximate save time difference is less than the selected fraction for the determined time period; and
          when the proximate save time difference is less than the selected fraction, pruning the target version,
       the target version being older in time than the next version, and proximate in time to the next version, the pruning including determining an identity of a first user that saved the target version and an identity of a second user that saved the next version and adjusting the proximate save time difference by a weighting factor upon determination that the first user is different from the second user;
    displaying a history of the group along a time line as part of a graphical user interface.

11. The method of claim 10, comprising:
    displaying the electronic content included in a selected one of the group.

12. The method of claim 10, wherein displaying comprises:
    displaying an indicator for each one of the group on the time line.

13. The method of claim 10, comprising:
    displaying a colored indicator for each one of the group on the time line, wherein a color of the colored indicator corresponds to an identity of a user that saved a corresponding member of the group.

14. The method of claim 10, comprising:
    receiving a command to prevent a version selected from the plurality of electronic content revisions from being pruned.

15. The method of claim 10, wherein displaying comprises:
    displaying the time line to include a series of unequal time segments.

16. The method of claim 15, comprising:
    displaying at least some of the unequal time segments in scaled temporal relationship with each other.

17. The method of claim 10, comprising:
revealing additional information about one of the group when a cursor of the graphical user interface hovers over an indicator on the time line corresponding to the one of the group.

18. The method of claim 10, comprising;
receiving a command to revert to a previous version in the group, the previous version being older than the most recent version; and
saving the previous version as the most recent version.

19. A system, comprising:
a display device to display electronic content;
a pruning module to prune versions of electronic content revisions from a plurality of electronic content revisions to select a group of unpruned versions of the electronic content by:
  determining a proximate save time difference between a target version of the plurality and a next version of the plurality of electronic content revisions, the target version and next version being stored in an archive history;
  determining an aged save time difference between a current time and one of the target version of the plurality of electronic content revisions or the next version of the plurality of electronic content revisions, the aged save time difference being associated with one of a plurality of specified time periods, the current time being different in time from the save time of the target version and the next version of the plurality of electronic content revisions; and
  repeatedly pruning the target version from the plurality of electronic content revisions stored in the archive history over time based on the proximate save time difference and the aged time difference, the target version being older in time than the next version, and proximate in time to the next version, the pruning comprising:
    determining an identity of a first user that saved the target version and an identity of a second user that saved the next version;
    adjusting the selected fraction proximate save time difference by a weighting factor upon determination that the first user is different from the second user;
    determining which one of a plurality of specified time periods the aged save time difference is associated with;
    for the determined time period, determining whether the proximate save time difference is less than the selected fraction for the determined time period;
    when the proximate save time difference is less than the selected fraction, pruning the target version; and
    when the target version has been pruned, selecting a next older version as the target version;
  the plurality of electronic content revisions being saved; and
a rendering module to display a history of the group along a time line as part of a graphical user interface on the display device.

20. The system of claim 19, comprising:
a user input device to select a selected one of the group for display in a time-machine mode that prevents changing any part of the selected one unless the selected one is the most recent version.

21. The system of claim 19, wherein the rendering module, comprises a portable document format processing program.

22. A non-transitory machine-readable storage medium having instructions stored therein for causing a machine to implement a method, comprising:
determining a proximate save time difference between a save time of a target version of electronic content and a save time of a next version of the electronic content, the save time of the target version being older in time than the save time of the next version, and proximate in time to the save time of the next version, the target version of the electronic content and the next version of the electronic content being saved versions of a plurality of revisions of the electronic content, the target version and next version being stored in an archive history;
determining an aged save time difference between a current time and one of the save time of the target version or the save time of the next version the aged save time difference being associated with one of a plurality of specified time periods, the current time being different in time from the save time of the target version and the save time of the next version of the electronic content; and
pruning the target version of the electronic content from the plurality of revisions of the electronic content stored in the archive history based on the proximate save time difference and the aged time difference, the pruning comprising:
  determining which one of a plurality of specified time periods the aged save time difference is associated with;
  for the determined time period, determining whether the proximate save time difference is less than the selected fraction for the determined time period; and
  when the proximate save time difference is less than the selected fraction, pruning the target version.

23. The medium of claim 22, wherein the method comprises:
displaying a history of the group along a time line as part of a graphical user interface, the time line being displayed to indicate at least some members of the group in unscaled temporal relationship with each other.

24. The medium of claim 22, wherein the method comprises:
displaying the time line to indicate a series of unequal time segments each labeled to indicate a respective span of time.

25. The method of claim 18, further comprising:
determining a role of a third user from which the command to revert is received; and
refraining from saving the previous version as the most recent version upon determination that the role of the third user is not an author or a coauthor.

26. The method of claim 1, wherein the one of a plurality of specified time periods is one day, and the corresponding threshold is 15 minutes.

* * * * *